United States Patent [19]

Jewell

[11] Patent Number: 4,891,503
[45] Date of Patent: Jan. 2, 1990

[54] DISTRIBUTED AUTHORIZATION SYSTEM

[75] Inventor: Thomas L. Jewell, Carlsbad, Calif.

[73] Assignee: Gascard, Inc., Carlsbad, Calif.

[21] Appl. No.: 174,839

[22] Filed: Mar. 29, 1988

[51] Int. Cl.$^4$ .............................................. G06F 15/21
[52] U.S. Cl. ............................... 235/380; 340/825.33; 364/408
[58] Field of Search ............... 364/400, 401, 405, 408; 235/379, 380, 381; 340/825.31, 825.33

[56] References Cited

U.S. PATENT DOCUMENTS

| | | | |
|---|---|---|---|
| 3,394,246 | 7/1968 | Goldman | 235/380 |
| 4,186,438 | 1/1980 | Benson et al. | 364/200 |
| 4,187,498 | 2/1980 | Creekmore | 340/825.33 |
| 4,558,211 | 12/1985 | Berstein | 235/380 |
| 4,775,784 | 10/1988 | Stark | 235/380 |

FOREIGN PATENT DOCUMENTS

| | | | |
|---|---|---|---|
| 0176072 | 4/1986 | European Pat. Off. | 364/405 |
| 0057368 | 4/1984 | Japan | 364/401 |
| 2172131 | 9/1986 | United Kingdom | 340/825.34 |

OTHER PUBLICATIONS

*IBM Tech. Disclosure Bulletin*, Chamoff et al., vol. 24, No. 2, Jul. 1981, pp. 976–978.

Primary Examiner—Jerry Smith
Assistant Examiner—David Huntley
Attorney, Agent, or Firm—Nydegger & Harshman

[57] ABSTRACT

A distributed authorization system and process for authorizing transactions utilizes a host computer communicating with a network of electronic terminals remote from the host computer. It includes storing negative file data in the electronic terminal containing information used to identify accounts for which requested transactions are to be denied, and storing authorization file data in the electronic terminal containing information used to determine whether to authorize a requested transaction. Upon entry of a transaction request, the data is checked against the terminal negative file data and immediately denied if the card account is contained in the terminal's negative file. If the transaction is not denied, authorization logic is performed in the electronic terminal resulting in terminal output denying the request, authorizing the request, or establishing an electronic connection from the terminal to the host computer to obtain authorization from the host computer. In establishing this connection, account data is transmitted from the host back to the remote electronic terminal resulting in terminal output either denying the request or authorizing the request. Also, during such connection, the terminal's authorization file is updated with account data, transmitted from the host computer to the electronic terminal. The completed transaction is stored in a terminal transaction queue file residing in the terminal for subsequent transmission to the host computer, and for use with a transaction request is subsequently entered at the terminal for the same account.

9 Claims, 3 Drawing Sheets

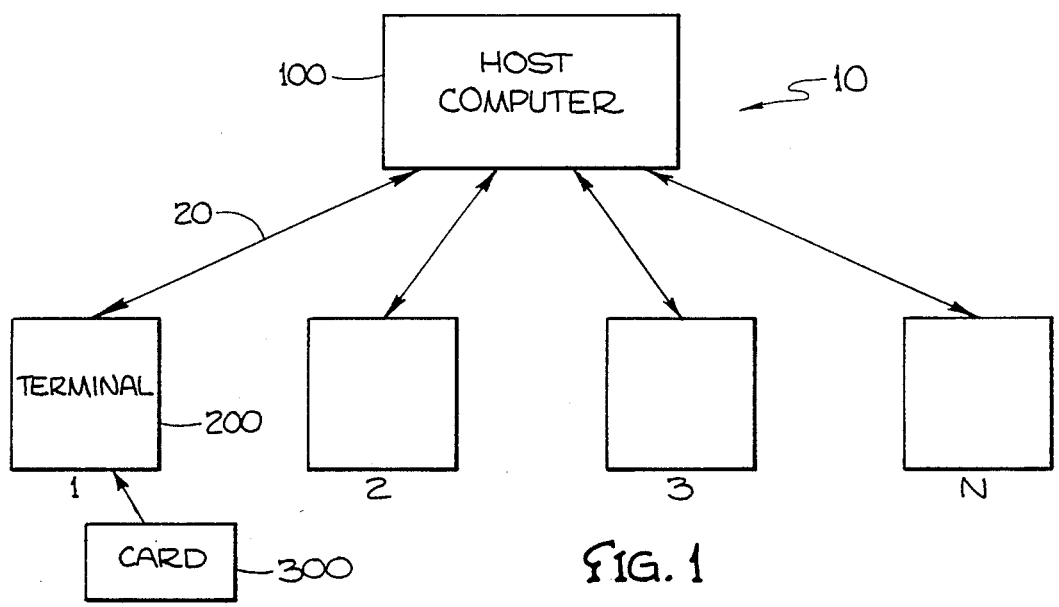
FIG. 1
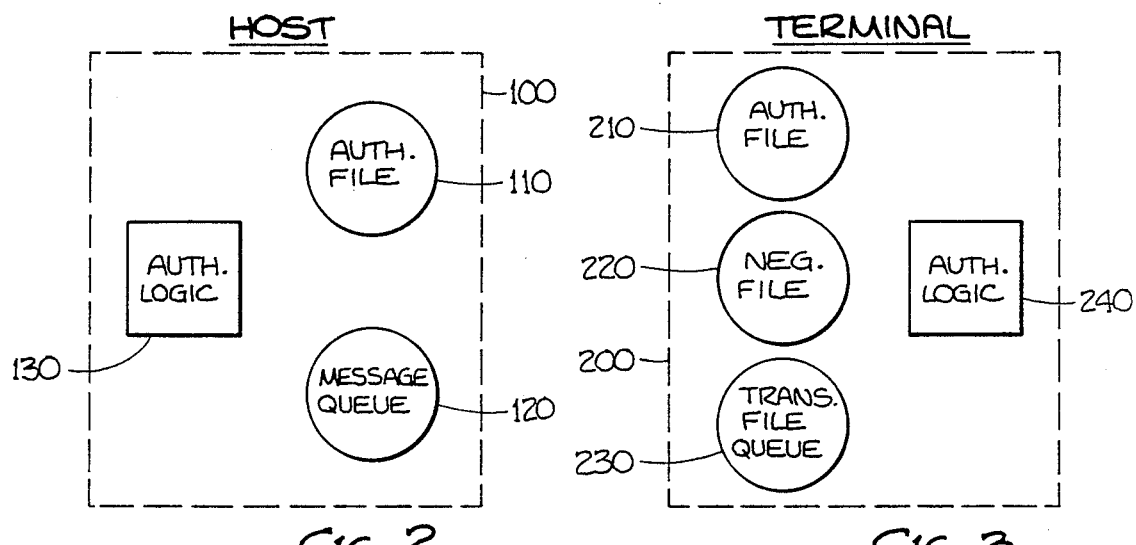
FIG. 2
FIG. 3

DISTRIBUTED AUTHORIZATION SYSTEM

BACKGROUND OF THE INVENTION

1. Field of the Invention

This invention relates to electronic systems for authorizing transactions, and in particular to authorization systems utilizing a host computer and a network of remote electronic terminals.

2. Description of the Prior Art

Historically, credit and debit authorization systems have been devised in an attempt to permit only those transactions that result in proper payment to the proper parties Typically, credit authorization systems involve the entity extending the credit (creditor), the entity providing the goods or services on credit to the customer (merchant), and the one to whom credit has been extended typically by issuance of a card representing access to credit (card holder). The creditor and merchant may be different or may be the same entity, but there is risk to both, namely, the risk of improper or lack of payment.

Conventional authorization systems seek to balance risk within recognized limits against the cost of the authorization service to determine under what conditions the transaction will be allowed. The cost of credit authorization should not outweigh the costs of potential risk.

In the early days of credit cards, mere possession of the card was considered sufficient to authorize the transaction. This is still prevalent in the oil industry. However, as the losses from fraud and bad credit accounts continued to mount, many companies, including creditors and merchants, published a periodic listing of credit card account numbers that would not be honored. This system, unfortunately, was fraught with errors, and it was difficult to keep the published listing up to date and distributed in timely fashion to the merchants and their employees. In addition, even if the proper report was with the merchant's employees or clerks, there was frequent neglect on the part of the clerk at the point of sale or transaction to utilize the published reports properly, if at all.

The next step in the evolution of credit authorization systems was the floor limit/voice authorization combination whereby smaller dollar transactions, i.e., below the floor limit would be allowed. However, those above the floor limit required a telephone call to a representative of the creditor or merchant who had access to current, or recent information on the status of a particular credit card account. The representative would then provide a code number via which they would guarantee the transaction would be collectable. These typically utilize telephonic voice equipment for contacting a representative having access to current or recent information in the host computer. These systems are still in wide use today, but are quite slow, cumbersome, and also error prone.

With the advent of low-cost electronic terminals, there have recently been major steps in the direction of virtually 100 percent electronic authorization. These systems are remote in the sense that they are at the point of sale or requested transaction, and the systems virtually guarantee payment for all authorized transactions. They also provide for electronic transfer of funds usually within 24 hours. Unfortunately, there are two significant problems associated with these types of systems: (1) customer waiting time in which the clerk, customer, and those in line behind the customer must wait an additional 30 seconds to 3 minutes or more to obtain the authorization; and (2) operating cost of making connections to the host computer, i.e., telephone calls. In most cases, each transaction requires a separate telephone call, and for low-value transactions the cost of the call can become the major expense of the authorization service.

There are some credit authorization systems which attempt to use the warning bulletin method by broadcasting via radio waves accounts which are identified as transactions which require host authorization even though the transaction request amount is below the floor limit for the terminal. However, such systems require geographic clusters of terminals and costly equipment to receive radio waves, and requires additional terminal memory, since the data is not terminal specific, i.e., based on a larger universe of required data with more data storage requirements. It's costly to manufacture and operate.

Another approach has been to use "smart" credit or debit cards wherein account information is modified and stored on the card itself. The major drawbacks with this approach are (i) the drastically increased cost to manufacture "smart" cards, and (ii) drastically increased complexity and cost of the electronic terminal user to accept and process "smart" card information.

Thus, conventional prior art authorization systems do not provide a cost-effective means of authorizing transactions quickly within acceptable limits of risk.

SUMMARY OF THE INVENTION

It is an object of the present invention to provide an authorization system and method which is capable of considerably reducing response time for a transaction to the user's benefit.

It is a further object of the present invention to provide a authorization system and method which minimizes the operating costs associated with providing the authorization transaction.

It is yet another object of the present invention to provide an authorization system and process which is able to achieve an acceptable level of authorization risk with minimal transaction time and operating cost.

It is another object of the present invention to provide a authorization system and process which offers a reliable authorization function with a minimum amount of error.

It is yet another object of the present invention to provide a distributed authorization system and method which provides improved security and accuracy at a fraction of the operating expense of conventional systems, while drastically reducing the authorization response time.

Further objects of the present invention will become apparent in the full description of the invention taken in conjunction with the drawings set forth below.

A distributed authorization system and process for authorizing transactions utilizes a host computer communicating with a network of electronic terminals remote from the host computer. It includes storing negative file data in the electronic terminal containing information used to identify accounts for which requested transactions are to be denied, and storing authorization file data in the electronic terminal containing information used to determine whether to authorize a requested transaction. Upon entry of a transaction request, the data is checked against the terminal negative file data and immediately denied if the card account is contained in the terminal's negative file. If the transaction is not denied, authorization logic is performed in the electronic terminal resulting in terminal output denying the request, authorizing the request, or establishing an electronic connection from the terminal to the host computer to obtain authorization from the host computer. In establishing this connection, account data is transmitted from the host back to the remote electronic terminal resulting in terminal output either denying the request or authorizing the request. Also, during such connection, the terminal's authorization file is updated with account data, transmitted from the host computer to the electronic terminal. The completed transaction is stored in a terminal transaction queue file residing in the terminal for subsequent transmission to the host computer, and for use when a transaction request is subsequently entered at the terminal for the same account.

The data stored in the completed transaction file are stored in the terminal in a message queue file for transmission to the host computer whenever a connection is established. The host computer stores all changes received in authorization data for a given account in a host authorization file update queue, storing a message to be sent to each remote electronic terminal identified in the host message queue file for the given account. Whenever a connection is made, this authorization file update queue file message is then sent by the host computer to the connected terminal that has an authorization on file for that account. The system and process also includes, in the event the connection has not been caused within a certain period of time, means for periodically causing the terminal to send queued information back to the host computer, and means for the host computer to periodically call terminals to exchange account information between the terminal queue file and host queue file concerning respective accounts. The electronic terminal also includes a feature whereby it deletes least recently used account data when its limited memory is full, and notifies the host computer of same.

BRIEF DESCRIPTION OF THE DRAWINGS

FIG. 1 is a schematic diagram showing the preferred arrangement of the component parts used in practice of the present invention.

FIG. 2 is a schematic diagram showing the component parts in the host computer used in practice of the present invention.

FIG. 3 is a schematic diagram showing the preferred component parts in the electronic terminal used in practice of the present invention.

DETAILED DESCRIPTION OF THE DRAWINGS

Figure 4:
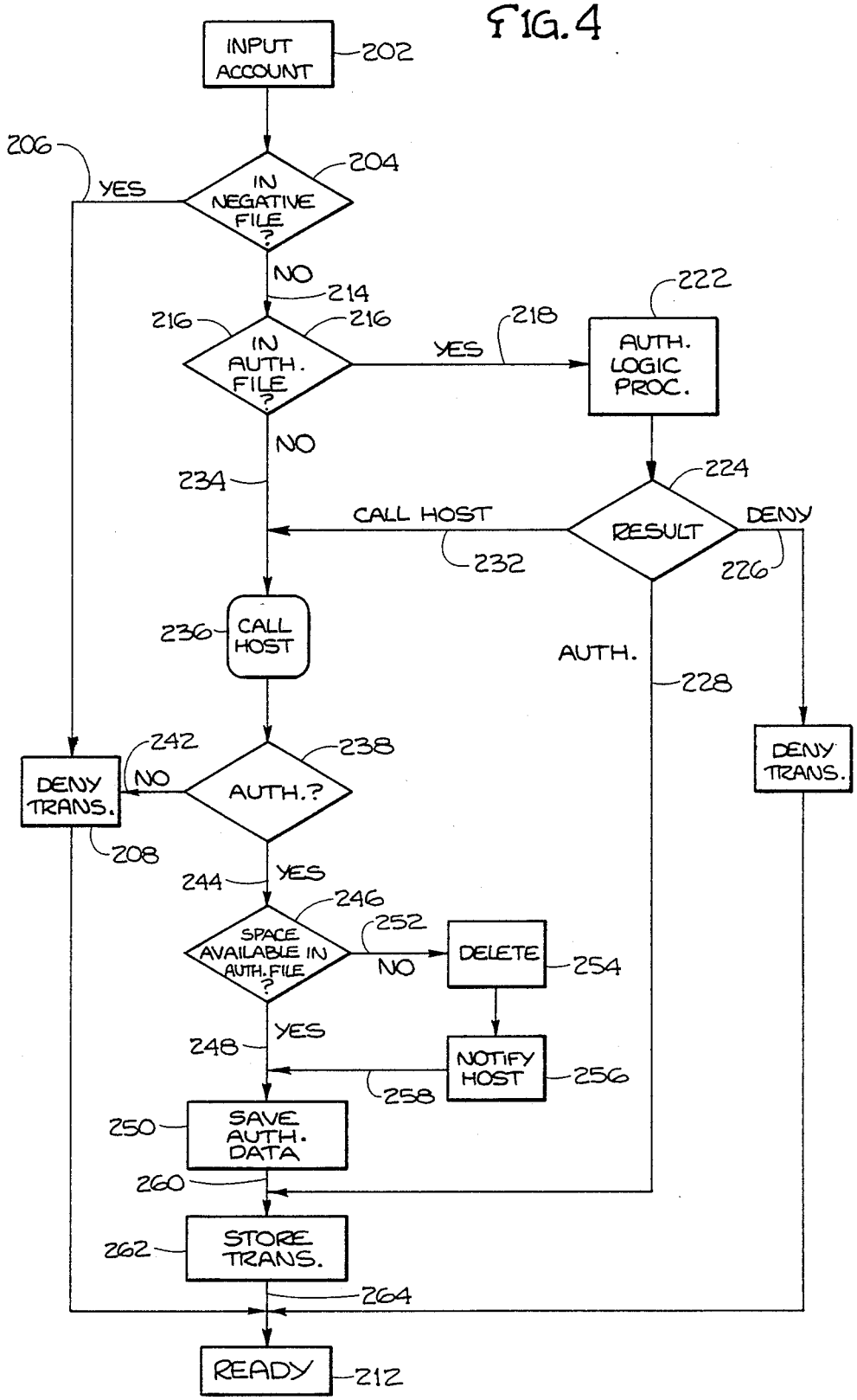
FIG. 4 shows a flow diagram of the sequence of operation of components in the electronic terminal in accordance with the present invention.

In describing a preferred embodiment of the invention illustrated in the drawings, specific terminology will be resorted to for the sake of clarity, however, the invention is not intended to be limited to the specific terms so selected, and it is to be understood that each specific term includes all technical equivalents which operate in a similar manner to accomplish a similar purpose.

Referring now to the drawings, there is shown in FIG. 1 an authorization system comprising a host computer 100 and terminals 200. While there is shown at least one terminal 200 in FIG. 1, there can be any number of electronic terminals up to N comprising a network of electronic terminals which communicate via electronic communication links 20. This can be in the form of a dedicated communications line to the host computer, or a conventional switched telephone line connection or other electronic data communication link which can be connected and disconnected at will. Also shown in FIG. 1 is an account 300, typically represented by an authorized debit or credit card used to access the electronic terminal 200. As used herein, electronic terminal may include a plurality of electronic terminals directly connected to a controller in which case the controller may contain the electronic terminal components described herein.

There is shown in FIGS. 2 and 3 the preferred components of the host computer 100 and electronic terminal 200, necessary in order to carry out the preferred embodiments of the present invention. In particular, as shown in FIG. 2 the components of the host computer 100 including host authorization file 110 which contains for each card account 300, a list of the terminals 200 that currently have a valid authorization for that card account. Also shown in FIG. 2 is a host message queue file 120 which contains for each terminal a list of messages stored in memory that are waiting to be sent to appropriate electronic terminals throughout the network.

The host computer is typically a digital computer such as a Tandem (Trademark) computer normally used in processing in credit and debit card authorization networks for on-line transaction processing, but can be any general purpose computer. The electronic terminal 200 is a typical micro computer electronic terminal typically utilized in authorization systems. It usually contains less memory and processing capability than does the host computer. However, it is typically located geographically remote from the host computer at strategic locations near the merchant or other locations convenient to the users thereof who are making transaction requests.

Further shown in FIG. 2 is host authorization logic 130 contained within the host computer 100 for processing logic to determine whether or not a requested transaction will be approved for a given account. The logic utilized may take any form of authorization logic required for the particular application as it is not specific to operation of this distributed authorization system. In a credit application, it typically involves a credit limit and a running update total of the amount of credit still available for a given account based on recent information. It may also involve other parameters as may be set by the designer of the system including the ability to freeze out accounts for one reason or another, or to assure the proper personal identification number and other criteria are met before an authorization is granted.

In FIG. 3 there is shown the preferred components for the system as presented in the present invention as contained in electronic terminal 200. There is shown terminal authorization file 210 which contains the card account numbers and other parameters used to authorize the transaction. There is also shown a negative file memory 220 contained in the electronic terminal 200 representing card account numbers for transactions that are to be denied authorization. There is also shown a transaction file queue 230 which is contained in the electronic terminal memory for storing completed transactions which have taken place at the terminal and have not yet been communicated to or reconciled with the host computer. There is also shown in terminal authorization logic 240 contained in the terminal 200 which contains logic similar to that which would be contained in the host computer 130 with respect to parameters and other information for processing authorizations.

Typically, the amount of memory and processing capability of the host computer 100 is much greater than that found in the remote electronic terminal 200. Therefore, it normally cannot contain all the information concerning all card accounts of the entire universe of card accounts utilized in the authorization system network, as does the host computer. However, as described hereinafter in the operation of this system, the limited information available for storage and processing at the terminal can be utilized in an effective manner to realize the benefits of the present invention.

Referring now to FIG. 4, there is shown a flow chart of the operation of the computer program within the electronic terminal 200 in the distributed authorization system and process described herein. For example, a card or other transaction request media is presented to the terminal 200 via a user input program 202 to accept entry of the account number provided necessary parameters are met with respect to allowing access to the terminal. The computer program 204 checks whether the card account previously entered is in the terminal's negative file. If the answer is yes 206 the system will deny the transaction 208 and return to the ready state 212 and indicates terminal output to that effect of denying of the transaction. If the card account is not 214 in the negative file, the system checks 216 to see whether the card account is contained in the terminal's authorization file. If it is contained 218 in the terminal's authorization file, the system will then perform authorization logic 222 having an output result 224 in which the transaction is denied 226, authorized 228, or an instruction is made to call 232 the host computer. As used herein, call refers to establishing an electronic connection between the terminal and the host computer, i.e., a terminal initiated communication with the host computer. If the credit account information is not contained in the terminal authorization file 234, the system also instructs the terminal to establish a connection and make contact 236 with the host computer. Accordingly, a call or contact is only made to the host typically in response to the above computer program instructions, and therefore it can be seen that a call is not necessary every time for every transaction request, since some transactions may be denied and many may be authorized locally at the terminal.

Upon call 236 to the host, the host authorization logic 130 is accessed 238 and the decision based on such computer program logic is indicated as to whether or not the transaction is to be authorized. Connection to the host can be made via any available communications technology, including switch telephone network modem, direct leased data communications lines, microwave, satellites, radio wave transmission and the like. If the transaction is not authorized 242 upon call of the host, the transaction is denied 208 and this result is output to the user, and the terminal operation returns to a ready 212 state. If the transaction is authorized 244 by the host, this is communicated by the host to the terminal.

The terminal authorization file is updated provided there is space available due to memory limitations within the computer memory contained in the electronic terminal. In this portion of the system and process, the computer program inquires as to whether space is available in the terminal authorization file 246 and if there is space available 248, the authorization data is saved 250 and the authorization file is updated. If there is no space 252 available in the authorization file of the terminal, the computer program is instructed to delete 254 the least recently used card account information and a record or notification 256 is made of the deletion, which will be communicated during a subsequent contact to the host computer. Upon completion of this process 258, then the authorization data is saved in the space now available due to the recent deletion.

Once the authorization data has been saved 260, the host-authorized transaction is then completed and stored 262 by the electronic terminal computer program. The transaction is also completed and stored 262 when it has been authorized 228 by the terminal authorization 222. Once the transaction has been stored in the transaction file 230, as shown in FIG. 3, its completion 264 is indicated and the system then returns to the ready state 212.

Figure 5:
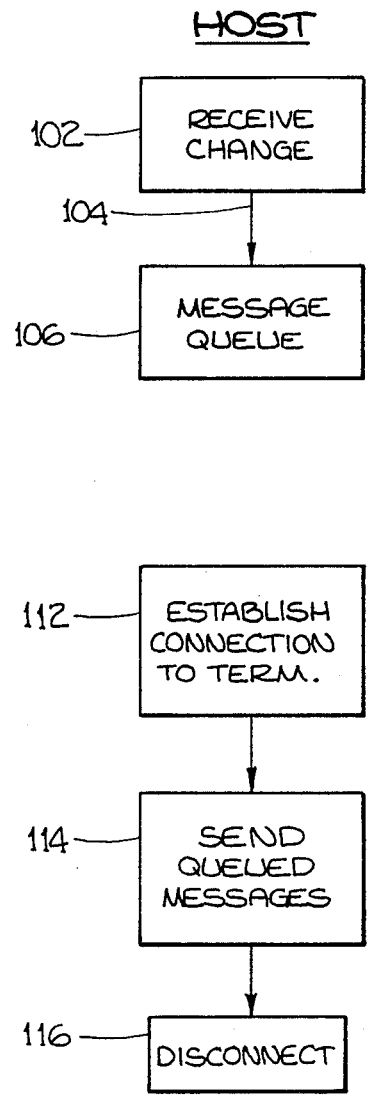
FIG. 5 shows a flow diagram of the sequence of operation of components in the host computer in accordance with the present invention.

Referring now to FIG. 5, there is shown preferred operation of the components in the host computer. In particular, the host computer receives changes 102 in the authorization data for a card account and sends the data 104 to a program 106 within the host computer which builds and queues a computer record message for each terminal in the host authorization file for a given card account. These messages are stored in the host computer memory 106 for subsequent transmission to one or more electronic terminals in the network whenever a connection is made to the terminals involved.

There is further shown in FIG. 5 a host computer establishing contact 112 with the electronic terminal and once contact is established, all queued messages for any given terminal are sent 114 to the terminal. Thus, for each terminal, a queue of stored messages 120 is stored in the host computer to be sent 114 to a terminal whenever a connection is made. Once the information has been exchanged between the host computer and the electronic terminal, the connection is then disconnected 116.

Thus, it can be seen that calls are made to the host computer by the electronic terminal only as required, and not necessarily upon presentation of every request for authorization for a transaction. The host computer also in accordance with the system and process described herein, only makes contact with the electronic terminal when an event causes a change in that authorization data requiring such a connection. Moreover, such messages are either sent immediately, such as a call from the host computer to the electronic terminal, or more typically during the next connection that is established in a subsequent transaction with the electronic terminal. Thus, the completed transactions are stored and only sent when required by the priorities indicated in the flow diagrams herein.

For certain classes of transactions, the distributed authorization system and process as embodied herein realizes benefits not heretofore recognized. The normal authorization time can be reduced down in practice to about one second, and the telephone/telecommunications expenses can be substantially reduced as discussed hereinafter. This is based on individual usage patterns, but it is found through experience that there are certain situations where the distributed authorization system can be of great benefit. The system herein is most applicable to situations where the customer frequently uses the same merchant location or electronic terminal. Examples are automated teller machines where the average user typically returns to the same automated teller machine location several times a month. Another application is grocery store check authorizations where most grocery shoppers pay by check and use a single store for their purchases about five times per month. In addition, gasoline stations present situations where people habitually purchase gasoline at the same one or two stations about seven times per month. Similar situations arise in convenience stores where individuals often stop at the store near their home or work as many as two to three times per week. Other examples are hardware and homecenter stores where users will visit their neighborhood hardware store nearly every weekend. Also, entertainment services such as movie theaters are typically adopted for this type of authorization system, as are commuter services. Any service or business in which the user repeats visits to the same provider of goods or services, and is desirous of using credit, can obtain extreme benefits from use of the present invention.

Accordingly, the present invention recognizes this and finds it is only necessary for the electronic terminal to request an authorization from the host whenever a new card account customer is presented at that particular electronic terminal. However, once the authorization information is granted by the host computer to the electronic terminal for that particular account, the terminal itself can then make a determination for as long as the authorization information is valid. Then when some external event such as a stolen card causes removal of the authorization, the host computer system merely sends the cancellation message to only those terminals that currently contain valid authorization for that particular card account. This is accomplished as described above. Also on a periodic basis, the completed transactions contained in the queue file at the electronic terminal may be transmitted from the terminal to the host for processing.

Moreover, the authorization file list stored in the electronic terminal computer memory is self regulating in the sense that the least recently-used credit account authorizations are eliminated when terminal memory space is needed for a new authorization. Through the periodic exchange of messages via the establishment of the electronic connection in the circumstances outlined above, the terminal and the host computer maintain file synchronization effectively so that the host computer effectively always knows what card accounts are authorized at which terminals.

An example of the call reduction as a result of the present invention is summarized as follows:

The advantage in reducing the number of telephone calls required to support the authorization and draft capture system is a function of (1) number of repeated transactions, (2) number of authorization file updates required, (3) telephone connect time required for a host authorization, and (4) time required to transmit a completed transaction.

First calculate the required number of calls under the conventional authorization systems. Assuming that each completed transaction is transmitted during the next authorization call, then this number is approximately equal to the number of transactions plus the number of host denials.

$$\text{Old \# calls} = \text{\# Transactions} + \text{\# Denials}$$

Next, calculate the number of completed transactions that can be transmitted during the normal authorization connect time (rounded up to the nearest billing increment)

$$\frac{\text{\# Transactions per}}{\text{Authorization Connection}} = \frac{\text{authorization connect time}}{\text{transmit time per transaction}}$$

Finally, calculate the percent reduction in calls, or call reduction as $$\text{Reduction} = \frac{\text{\# Transactions} - \text{\# Updates} - \text{\# Auths} - \frac{(\text{\#Trans})}{(\text{\#Tran/Auth})}}{\text{Old \# calls}}$$

For example:

During a sample period, a terminal produced 1,000 transactions and incurred 100 host denials. The 1,100 authorizations were for 120 different cards. During this period, four of the cards required a file update due to lost/stolen activity or change in available credit. A normal conventional host authorization takes 27 seconds and it takes 3 second to transmit a completed transaction to the host.

$$\text{Old \# calls} - 1,000 + 100 = 1,100$$

$$\text{\# Transactions per connection} = \frac{27 \text{ seconds}}{3 \text{ seconds}} = 9$$

or, rounding up to next increment, $$\text{\# Transactions per connection} = \frac{30 \text{ seconds}}{3 \text{ seconds}} = 10$$

Finally, $$\text{Reduction} = \frac{1,000 - 4 - 120 - \frac{(1,000)}{(10)}}{1,100} = \frac{776}{1,100} = 70.5\%$$

This indicates that the number of calls, and the associated expense, would be reduced by 70.5% using the distributed authorization system described herein.

This example also indicates that only 120 of the 1,100 attempted transactions will require a call to the host computer. The response time for the remaining 980 transactions is reduced to essentially zero.

Note that in this example, even if the number of cards is as high as 75% (indicating very little 23% repeat usage of 23%), there is still a 13% advantage using the distributed authorization system described herein.

The present invention is able to provide the majority of the security and accuracy of a host-based authorization system at a fraction of the operating expense while drastically reducing the authorization response time.

Although the present invention has been shown and described in terms of specific preferred embodiments, it will be appreciated by those skilled in the art that changes or modifications are possible which do not depart from the inventive concepts described and taught herein. Such changes and modifications are deemed to fall within the purview of these inventive concepts. Thus, it should be noted that the accompanying description and drawings are meant to describe the preferred embodiments of the invention, but are not intended to limit the spirit and scope thereof.

What is claimed is:

1. A distributed authorization system for authorizing and denying requested transactions concerning an account, said system utilizing a host computer communicating with at least one electronic terminal remote from the host computer, comprising:

means for storing data in a negative file residing in the electronic terminal for containing information based on previous transactions specific to that terminal used to identify accounts for which requested transactions are to be denied authorization;

means for storing data in an authorization file residing in the electronic terminal containing information based on previous transactions specific to that terminal used to determine whether to authorize a requested transaction concerning an account;

means for entering transaction data into the electronic terminal for requesting a transaction concerning a specific requested account;

means for checking said transaction request data against said terminal negative file data, said checking means generating terminal output denying said transaction request when said requested account is contained in said terminal negative file;

means for performing authorization logic in the electronic terminal in the event said transaction request is not denied at the terminal, said logic means including means for checking whether said requested account is contained in said terminal authorization file, said logic means being responsive to said requested account being found in said terminal authorization file for generating a terminal output signal (i) denying the request, or (ii) authorizing the request, said logic means further being responsive to said requested account not being found in said terminal authorization file for establishing an electronic connection from the electronic terminal to the host computer to obtain authorization from the host computer, in which new account data for said requested account is transmitted from the host computer back to the electronic terminal resulting in terminal output (i) denying the request, or (ii) authorizing the request;

means for adding said new account data to said terminal authorization file; and means for storing completed transaction data in a transaction queue file residing in the electronic terminal for subsequent transmission to the host computer.

2. The system of claim 1 further comprising means for transmitting said stored data for said completed transactions queued in said terminal transaction message queue file from the electronic terminal to the host computer whenever said connection is made between the electronic terminal and the host computer.

3. The system of claim 2, further comprising means for periodically establishing a connection from said terminal to the host computer to send queued messages from the terminal to the host computer when there has not been activity from the electronic terminal for a given account to the host for a period of time.

4. The system according to claim 1, further comprising the host computer having means for receiving changes in authorization data for a given account, and means for storing said authorization file data in a host message queue file wherein there is stored a message for each remote electronic terminal identified in said host message queue file for said given account.

5. The system of claim 4, further comprising means for sending electronic message to all terminals having activity for a given account of all changes in said account authorization file data.

6. The system of claim 4 further comprising said host computer including means for instructing said host computer to establish a connection to an electronic terminal, and means for transmitting any and all queued messages designated to that terminal, and means for disconnecting said connection.

7. The system of claim 1, further comprising means for transmitting information concerning deletion of account information from the terminal authorization file.

8. The system of claim 1, further comprising the host having means for establishing a connection to the electronic terminal on a periodic basis.

9. A distributed authorization process for authorizing and denying requested transactions concerning an account, said system utilizing a host computer communicating with at least one electronic terminal remote from the host computer, comprising the steps of:

storing data in a negative file residing in the electronic terminal for containing information based on previous transactions specific to that terminal used to identify accounts for which requested transactions are to be denied authorization;

storing data in an authorization file residing in the electronic terminal containing information based on previous transactions specific to that terminal used to determine whether to authorize a requested transaction concerning an account;

entering transaction data into the electronic terminal for requesting a transaction concerning a specific requested account;

checking said transaction request data against said terminal negative file data, said checking means generating terminal output denying said transaction request when said requested account is contained in said terminal negative file;

performing authorization logic in the electronic terminal in the event said transaction request is not denied at the terminal, including checking whether said requested account is contained in said terminal authorization file, and generating a terminal output signal (i) denying the request, or (ii) authorizing the request in response to said requested account being found in said terminal authorization file, and establishing an electronic connection from the electronic terminal to the host computer to obtain authorization from the host computer, in response to said requested account not being found in said terminal authorization file, in which new account data for said requested account is transmitted from the host computer back to the electronic terminal resulting in terminal output (i) denying the request, or (ii) authorizing the request;

adding said new account data to said terminal authorization file; and storing completed transaction data in a transaction queue file residing in the electronic terminal for subsequent transmission to the host computer.

* * * * *